United States Patent [19]

Yeng et al.

[11] Patent Number: 5,270,139
[45] Date of Patent: Dec. 14, 1993

[54] PHOTOCONDUCTOR COMPRISING BISAZO AND SQUARYLIUM PIGMENTS AS THE CHARGE GENERATION MATERIAL

[75] Inventors: Feng-Wen Yeng; Jia-Ming Liu, both of Hsinchu, Taiwan

[73] Assignee: Industrial Technology Research Institute, Taiwan

[21] Appl. No.: 908,174

[22] Filed: Jul. 2, 1992

[51] Int. Cl.$^5$ ............................................. G03G 5/047
[52] U.S. Cl. ...................................... 430/58; 430/59; 430/78
[58] Field of Search ............................... 430/58, 59, 78

[56] References Cited

U.S. PATENT DOCUMENTS

| | | | |
|---|---|---|---|
| 3,824,099 | 7/1974 | Champ et al. | 430/59 |
| 4,353,971 | 10/1982 | Chang et al. | 430/58 |
| 4,435,492 | 3/1984 | Suzuki et al. | 430/58 |
| 4,983,483 | 1/1991 | Tsai | 430/59 |

FOREIGN PATENT DOCUMENTS 2-154272 6/1990 Japan .

*Primary Examiner*—Roland Martin
*Attorney, Agent, or Firm*—Scully, Scott, Murphy & Presser

[57] ABSTRACT

A new organophotoconductor comprising a conductive substrate, a charge generation layer and a charge transport layer wherein the charge generation layer comprises a bisazo compound and a squarylium compound as the charge generation material. The organophotoconductor exhibits high sensitivity, low residual potential and improved durability and reproducibility.

15 Claims, No Drawings

PHOTOCONDUCTOR COMPRISING BISAZO AND SQUARYLIUM PIGMENTS AS THE CHARGE GENERATION MATERIAL

BACKGROUND OF THE INVENTION

The present invention relates to a new charge generation material for organophotoconductors, in particular, to an improved bisazo compound and a squarylium compound as the charge generation material for novel, high performance organophotoconductors in copy machines or laser printers.

Copy machines play important roles in office automation and provide fast and convenient copy services. The copy process utilizes xerography as discovered by C. Carlson in 1938. Based on this technology of producing high quality permanent images, the xerographic process comprises six steps, namely, (1) photoconductor charging, (2) image exposure, (3) image development, (4) image transferring, (5) fixing of image, and (6) cleaning of photoconductor. The photoconductor, similar to the human heart, has a major role in the copy process.

Normally, photoconductors can be classified as inorganic or organic. Conventional photoconductors used in copy machines, for example, selenium, cadmium sulfide, zinc oxide, etc., are inorganic. However, organophotoconductors are gradually being adopted, becoming commercially available and widely applied in laser printers and copy machines. The advantages of using organophotoconductors are (1) no toxic pollution from inorganic metals, (2) low cost of manufacturing, (3) easy manufacture of different shapes, e.g. drum, belt and sheet, and (4) clear image production. However, the sensitivity, the stability towards light and heat and the durability of organophotoconductors are still lower than those of inorganic photoconductors. Thus, organophotoconductors are now mainly used in copy machines of low or middle copying speed.

The so-called organophotoconductor is an insulator in darkness. After exposure in light, it will absorb photons to separate charges and form electron-hole pairs, wherein electrons and holes move towards different directions in an externally applied magnetic field in becoming a conductor. In other words, the organophotoconductor will produce charges while lighting and maintain the charges on a surface in darkness; but it cannot be quickly photoneutralized and should possess charge transport structures. With development, the structures of organophotoconductors are classified as monolayer type or functionally separated laminated type. The latter, the most preferred type, contains a conductive substrate, a charge generation layer and a charge transport layer. When the charge generation layer is exposed to light, it is capable of producing electron-hole pairs. The charge transport layer is responsible for transporting electrons or holes onto the surface of organophotoconductors. Moreover, the charge generation layer is composed of very small particles of charge generation materials evenly dispersed in a polymer binder. Generally, the charge generation materials are organic pigments, such as squarylium pigment, phthalocyanine pigment, bisazo pigment, etc. The effect of the charge generation materials is absorbance of injected light and production of electrons. Thus, the organic pigments should possess an excellent degree of absorbance towards the selected light. Fluorescent light is normally used in copy machines and emits visible lightwaves of 450 nm to 650 nm. That is, the charge generation materials of organophotoconductors used in copy machine possess excellent sensitivity towards the above visible lightwaves. In particular, due to their advantages in good sensitivity and selectivity towards visible light, bisazo pigments are widely used in organophotoconductors for the range of visible light. A lot of U.S. patents relate to bisazo pigments, but commercially available bisazo pigments for photoconductors in these patents are rare. The major reason is that the pigments do not result in satisfactory sensitivity, stability towards light and heat and durability. In particular, such pigments lack absorbent capabilities towards near-infrared light with a wavelength of 700 nm to 850 nm and cannot be applied in laser printers.

The organic pigments, such as squarylium pigment, can absorb near-infrared light. U.S. Pat. No. 3,824,099 discloses a squarylium pigment having an excellent sensitivity of absorbance but high dark decay and extremely low charge acceptances are the results in synthesis process. Although the squarylium pigment possesses sensitivity towards near-infrared light, it cannot be practically applied in organophotoconductors.

Almost more than one hundred patents relate to charge generation materials for organophotoconductors, but only a few relate to mixtures composed of two or more organic pigments as charge generation materials. More particularly, there is no disclosure about mixtures of squarylium pigment, and bisazo pigment as charge generation materials as in the present invention. The advantages and drawbacks of U.S. Pat. No. 4,353,971 and U.S. Pat. No. 4,983,483 and Japan Patent 02,154,272, which are relevant to this application, Will be discussed below. The characteristics of U.S. Pat. No. 4,353,971 are utilization of a mixture of different squarylium pigments and diamine blue dyes as the charge generation material and use of a organic compound, such as hydrazones or 2-pyrazolines, coated thereon as the charge transport layer to form organophotoconductors. The range of wavelength absorbance for the charge generation materials disclosed in the patent is 400 nm to 1150 nm of visible light and near-infrared light, but the sensitivity thereof is only 132 uJ/cm$^2$ which cannot satisfy practical use requirements. The ideal value of sensitivity should be within 1 uJ/cm$^2$.

The key point of US Patent No. 4,983,483 is utilization of a mixture of squarylium pigments and copper phthalocyanine pigments which is dry milled in a ball mill to transfer the crystal shape and then wet milled in a sand mill for 20 hours to form charge generation materials. The sensitivity of organophotoconductors obtained at near-infrared light is 0.5 uJ/cm$^2$, but that in the range of visible light is still not high enough for use in copy machines. The characteristic of Japan Patent No. 02,154,272 is use of a mixture of two kinds of bisazo pigments as charge generation materials. The organophotoconductors produced have a wide range of absorbance, from 450 nm to 850 nm. The sensitivity of the patent will reach 1.5 Lux.sec to 1.8 Lux.sec. But the synthesis for each bisazo pigment in the mixtures really wastes time. The difficulty in purifying is noted and, especially the manufacture of organophotoconductors in large scale research or for commercial purpose is greatly challenged.

In order to improve the drawbacks of the above patents, the present invention provides a new bisazo pigment which can absorb the wavelengths of visible light and furthermore, a new charge generation material for organophotoconductors by mixing the bisazo pigment and a squarylium pigment which can absorb the wavelength region of near-infrared light. The new charge generation materials in the invention will absorb both visible light and near-infrared light, have excellent photosensitivity, charge acceptance, stable photoconductivity and durability, and then can be used in commercially available organophotoconductors for copy machines or laser printers.

SUMMARY OF THE INVENTION

Therefore, the objective of the present invention is to provide a new charge generation material comprising squarylium pigments and bisazo pigments for organophotoconductors having stability towards light and heat and excellent charge generation capabilities.

Another objective of the present invention is to provide xerographic organophotoconductors having good sensitivity, low residual potential, durability and stable properties after repeated uses at visible light and near-infrared light.

A further objective of the present invention is to provide a functionally separated laminated type organophotoconductor comprising the new charge generation material.

These and other objects, advantages and features of the present invention will be more fully understood and appreciated by reference to the written specification.

DETAILED DESCRIPTION OF THE INVENTION

The present invention relates to a mixture comprising specific ratios of bisazo pigment and squarylium pigment as a novel charge generation material contained in organophotoconductors. Furthermore, the charge generation material is dispersed in a polymer binder to obtain a charge generation layer which is coated on a conductive substrate and then a charge transport layer is coated thereover to form organophotoconductors. It is unexpectedly found that the organophotoconductors produced by employing bisazo pigment and squarylium pigment as the charge generation material have high sensitivity, low residual potential and good durability. The bisazo pigment for the charge generation material in the present invention has the general formula (I) as follows:

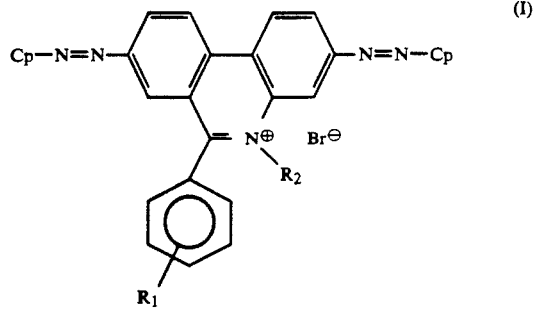

wherein $R_1$ represents hydrogen, alkyl with 1-6 carbon atoms, halogen, methoxy or nitro and $R_2$ represents alkyl with 1-3 carbon atoms. Cp represents hydroxy coupling ingredient residues with coupling activity which is bonded with diazonium salt in forming the bisazo compound. Cp has the general formula (II) of:

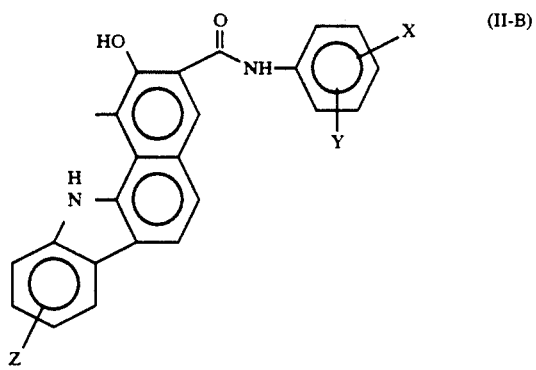

wherein X and Y both or independently represent hydrogen, methoxy, nitro, alkyl or halogen, and Z represents methoxy, hydrogen, nitro, alkyl or halogen.

In accordance with the above disclosure, the bisazo compound contemplated by the invention has structure formula (I-A) as follows.

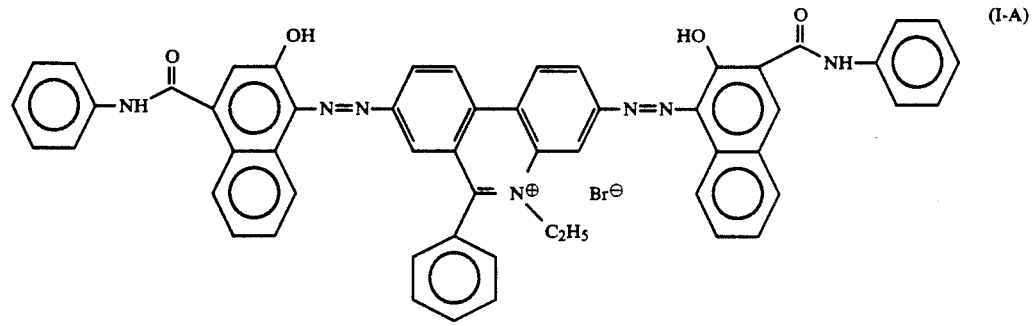

The new bisazo compound in the present invention can be produced according to the conventional method which will be briefly described. Generally, diamino compounds (IV) are dissolved in a solution of concentrated hydrochloric acid and water in an ice bath at a temperature of 0° C. and the mixture is stirred for 0.5 hour. Then a solution of sodium nitrite and water is added drop by drop. The mixture is still kept in the ice bath and stirred for another 2 hours The undissolved solids are filtered off and 40% tetrafluoroboric acid is added into the filtrate to obtain tetrazonium salts. The tetrazonium salts are then reacted separately with different coupling ingredient residues containing hydroxy, shown as formulas (II-A) and (II-B), to obtain bisazo pigments. The diamino compounds are commercially available from Aldrich Chemical Company or synthesized according to the method disclosed in J. Chem. Soc. 1952, 3059.

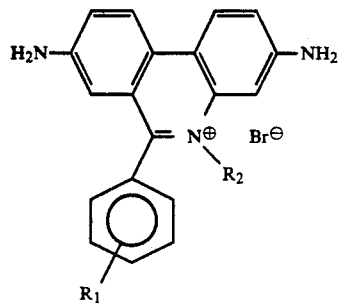

(IV)

The other component for charge generation materials disclosed in the present invention is squarylium pigment with the general formula (III) of

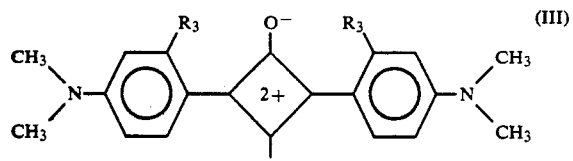

(III)

wherein $R_3$ represents hydrogen, hydroxy or $C_{1-6}$ alkyl. Preferably, $R_3$ is hydroxy.

Generally, squarylium compounds are synthesized by acid route. The manufacture method of squarylium compounds is a prior art and has been recited in "Dye and Pigment 9(1988) 187-200, Journal of Imaging Science 31:172-177 & 32:60-64". The reference is herein incorporated for reference. The reaction formula is shown as follows.

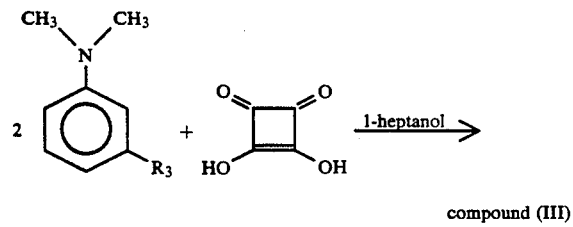

compound (III)

Normally, one equivalent mole of squarylium acid is reacted with 2 equivalent moles of substitute of N,N-dimethylaniline in a solution of 1-heptanol to produce a 40%-95% yield of squarylium compounds.

The charge generation materials in the present invention comprises bisazo pigments and squarylium pigments in a ratio of 1 to 6, and preferably in a ratio of 1.5 to 2 by weight. After dry milling for 2 to 6 hours, the obtained mixture is the novel charge generation materials. The dry milling is proceeded in a ball mill, sand mill, homomixer or micronizing mill, the preferred method used in this invention being dry milling via a homomixer which further utilizes stainless steel balls for mixing.

The organophotoconductor in the invention is functionally separated laminated type which is composed of a conductive substrate, a charge generation layer coated on top of the conductive substrate and a charge transport layer coated on the charge generation layer. The charge generation layer in the organophotoconductor is prepared by dispersing the charge generation material in a polymer binder resin and a suitable solvent to obtain a coating solution. The coating solution is coated on top of the conductive substrate via dip coating or Mayer-Bar coating to form a charge generation layer of 0.1 to 5 μm thickness which is then dried in an oven.

The polymer binder resin for coating is selected from resins for insulation and a suitable polymer binder comprises polyester, polyvinyl butyral, polycarbonate, polyamides, cellulose acetate-butyrate, phenolic resin and phenoxy resin. The charge generation material and the polymer binder are in the ratio of 3:1 to 1:3 by weight. Furthermore, the solvent used in the charge generation layer can dissolve the polymer binder resin but cannot dissolve the charge generation materials. That is, the suitable solvent is selected from tetrahydrofuran, 1,4-dioxane, cyclohexanone, methyl ethyl keton, N, N-diethylformamide, etc. The solid content of the prepared charge generation coating solution is in the range of 0.5 to 5% by weight.

However, the charge transport layer is necessary for the organophotoconductor and further coated on the charge generation layer. The preparation of the charge transport layer coating comprises dissolution of charge transport materials and a polymer binder resin in a suitable solvent. Normally, the charge transport materials comprise hydrazone, such as p-diethylaminobenzaldehyde-N,N-diphenyl hydrazone, p-diethylaminobenzaldehyde-N-alpha-naphthyl-N-phenyl hydrazone, 2-pyrazoline, such as 1-phenyl-3-(p-diethylaminophenyl-propenoyl)-5-(p-diethylaminophenyl) 2-pyrazoline and triaryl methanes, such as bis(4-diethylamino-2-methylphenyl)-phenylmethane. The suitable polymer binder resin is selected from acrylic resin, polyallylate, polyester, polycarbonate, polystyrene, acrylonitrile-styrene co-polymer, epoxy resin, phenolic resin and phenoxy resin. And the suitable coating method is spray coating, Mayer-Bar coating, dip coating, etc. The charge transport material and the polymer binder resin are in the ratio of 1:3 to 3:1 by weight and the layer thickness of 10 to 30 μm is preferable.

Additionally, in order to improve functions of the organophotoconductor, a blocking layer may be inserted between the conductive substrate and the charge generation layer. The effect of the blocking layer is to prevent back-injection of electrons of the conductive substrate into the charge generation layer. The film thickness of the blocking layer is generally from 0.1 μm to 3.0 μm. The material for the blocking layer is selected from polyamide, polyvinyl alcohol, nitrocellulose, polyurethane or casein.

Now, the above disclosed organophotoconductor has excellent sensitivity of 0.5 Lux.sec to 2.5 Lux.sec towards visible light and near-infrared light, low dark decay and low residual potential and can be widely applied in copy machines, laser printers and other xerographic equipment. More importantly, the charge generation layer coating solution is treated by dispersion and grinding process for only 6 to 8 hours to form a evenly dispersed and stable coating solution. After use for one month, reproducibility is still high and the organophotoconductors in the present invention is very suitable for commercial purposes. If the above prepared squarylium pigments or bisazo pigments are individually used as charge generation materials, the charge generation layer coating solution obtained from the former will produce precipitates the second day and show uneven dispersion, and that obtained from the latter will have the coating solution seriously aggregated. Hence, both of the above cannot obtain excellent photoconductive organophotoconductors. On the contrary, the mixture of the above two pigments as the charge generation material in the present invention overcomes drawbacks of the pigments individually used as charge generation materials. Furthermore, the combination of novel bisazo compounds and conventional squarylium compounds as the charge generation material in organophotoconductors is first disclosed in the present invention.

From the following examples and comparative examples, it is clearly shown that only novel bisazo pigments in the invention or conventional used squarylium pigments cannot form organophotoconductors having fast photoconductivity. Hence, the two pigments should be mixed together within a specific ratio as the charge generation material for the organophotoconductors which has low dark decay, low residual potential and high photoconductivity towards visible light or near-infrared light. That is, the organophotoconductors disclosed in the present invention can be widely applied in conventional printers using visible light, laser printers using near-infrared light, LED printers utilizing xerography theory, etc.

The following examples are offered by way of illustration. The examples are not intended to be limiting to the scope of the invention in any respect and should not be so construed.

EXAMPLES

Example 1

(1) The preparation of a blocking layer coating solution 50 grams polyamide copolymer were dissolved in a solvent solution composed of 300 grams methanol and 100 grams N-butanol. After vigorous stirring, a blocking layer coating solution was obtained.

(2) The preparation of a charge generation layer coating solution 2.25 grams bisazo compounds (I-A) and 2.25 grams squarylium compounds (III-1) as shown below were mixed in a 500 ml grinding can in which two thirds of the volume was filled with strain balls of 0.8 cm diameter. The mixture was dry milled in a homomixer for 4 hours. Then, 219 grams cyclohexanone solution containing 4.57% polyvinyl butyral (BM-2 available from Sekisui Chemical, Japan) were added and subsequently wet milled in a homomixer for 6 hours. 200 grams cyclohexaneone was added to dilute the mixture and to obtain the charge generation layer coating solution in the invention.

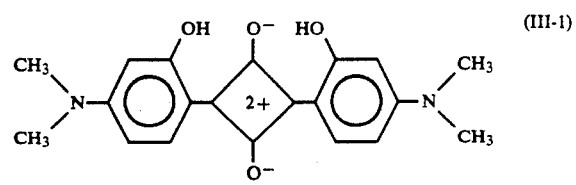

(3) The preparation of a charge transport layer coating solution 75 grams styrene-methyl methacrylate copolymer (MS 200 available Seitetsu Chemical, Japan) were dissolved in 500 grams toluene, and then 50 grams charge transport material having the following formula structure was added. After vigorous stirring, the charge transport layer coating solution in the invention was obtained.

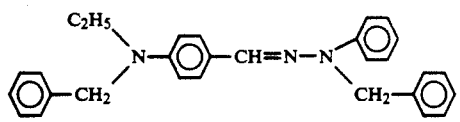

(4) The preparation of organophotoconductors

An aluminum plate of 0.2 mm thickness was coated with a blocking layer via dip coating and then was dried in an oven at a temperature of 95° C. for 30 min. After hardness, the blocking layer of 1.0 g/cm$^2$ thickness on the aluminum plate was obtained. Then a charge generation layer coating solution was coated thereon via dip coating and was dried in an oven at a temperature of 95° C. for 30 min. After hardness, the charge generation layer of 0.3 g/cm$^2$ thickness was obtained. Finally, a charge transport material coating solution was coated on top of the charge generation layer via Mayer-Bar coating and was dried in an oven at a temperature of 95° C. for one hour to obtain a charge transport layer of about 17 μm thickness.

The resultant organophotoconductor was tested by Electrostatic Paper Analyzer Model EPA-8100, manufactured by Kawaguchi Electric, Japan, to determine its photoconductivity. The corona charge was set at −5.0 kV and the corona rate was set at 5 m/min. The initial surface potential on the sample after was recorded as Vo. After 2 seconds of dark decay, the surface potential was recorded as Vd. The sample was exposed under a tungsten light source of 10 Lux intensity and the surface potential began to attenuate. The light energy was consumed until the surface potential dropped to one half of Vd (half decay exposure) was calculated and recorded as $E_{\frac{1}{2}}$ (in Lux.sec). When the tungsten light source was replaced by lights with wavelength of 780 nm and 633 nm, the half decay exposures were recorded as $E_{\frac{1}{2}}{}^{780}$ and $E_{178}{}^{633}$ (in Lux.sec), respectively. The obtained results are listed in Table 1.

Example 2:

The steps and operating conditions in Example 1 were repeated. But in the charge generation layer coating solution, the total weight of compound (I-A) and compound (III-1) was kept constant and the weight ratio of the two compounds was changed to 2:1. The obtained results are listed in Table 1.

Example 3:

The steps and operating conditions in Example 1 were repeated. But in the charge generation layer coating solution, the total weight of compound (I-A) and compound (III-1) was kept constant and the weight ratio of the two compound was changed to 4:1. The obtained results are listed in Table 1.

Example 4:

The steps and operating conditions in Example 1 were repeated. But the charge transport material in the charge transport layer coating solution was replaced by the following compound. And the obtained results are listed in Table 1.

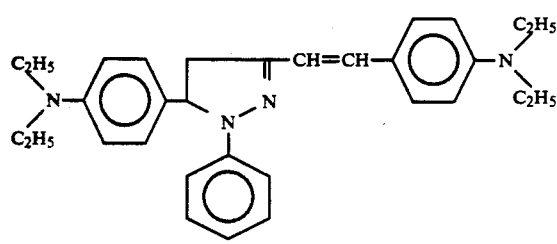

Example 5:

The steps and operating conditions in Example 1 were repeated. But the charge transport material in the charge transport layer coating solution was replaced by the following compound. And the obtained results are listed in Table 1.

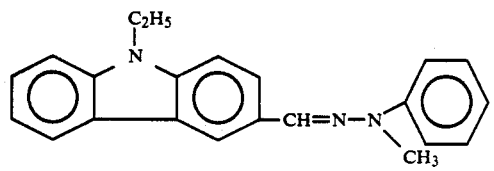

Comparative Example 1

The steps and operating conditions in Example 1 were repeated. But in the charge generation layer coating solution, the total weight of compound (I-A) and compound (III-1) was kept constant and the ratio of the two compound was changed to 1:0. The obtained results are listed in Table 1.

Comparative Example 2

The steps and operating conditions in Example 1 were repeated. But in the charge generation layer coating solution, the total weight of compound (I-A) and compound (III-1) was kept constant and the ratio of the two compounds was changed to 0:1. The obtained results are listed in Table 1.

TABLE 1

| Example No. | Vo (volt) | Vd (volt) | $E_i^{633}$ (Lux.sec) | $E_i^{780}$ (Lux.sec) |
|---|---|---|---|---|
| 1 | −930 | −920 | 0.8 | 0.75 |
| 2 | −890 | −860 | 1.8 | 2.5 |
| 3 | −870 | −800 | 2 | 2.5 |
| 4 | −900 | −870 | 0.8 | 1.25 |
| 5 | −890 | −850 | 1.25 | 1 |
| Comp. 1 | −890 | −820 | 8 | 9 |
| Comp. 2 | −540 | −360 | 2.2 | 2.5 |

As shown by the above examples, the mixture composed of bisazo compounds and squarylium compounds used as the charge generation material can function well with different charge generation materials. The organophotoconductor according to the present invention exhibits high sensitivity, low dark decay, and low residual potential even after repeated uses and thus is highly durable for practical usage.

Of course it is understood that the above is merely a preferred embodiment of the invention and that various changes and alterations can be made without departing from the spirit and broader aspects thereof as set forth in the appended claims.

What is claimed is:

1. An organophotoconductor comprising a conductive substrate, a charge generation layer and a charge transport layer wherein the charge generation layer comprises:

(a) a polymer binder;

(b) a bisazo compound of formula (I)

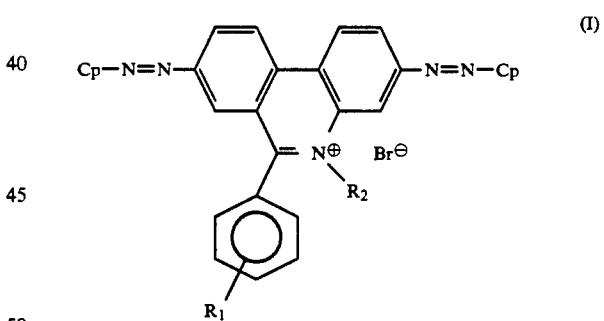

wherein $R_1$ is hydrogen, alkyl with 1–6 carbon atoms, halogen, methoxy or nitro;

$R_2$ is alkyl with 1–3 carbon atoms; and

Cp is an hydroxy coupling ingredient residue of formula (II)

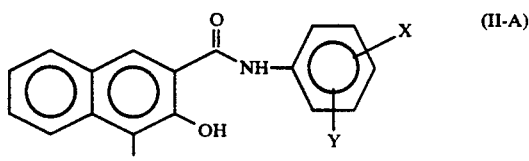

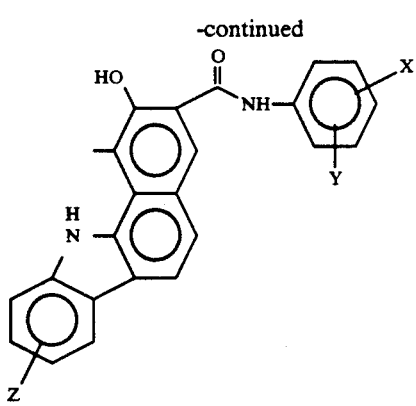

wherein

X and Y are both independently hydrogen, methoxy, nitro, alkyl or halogen; and

Z is methoxy, hydrogen, nitro, alkyl or halogen; and (c) a squarylium compound of formula (III)

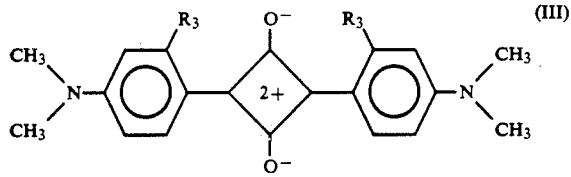

wherein $R_3$ is hydrogen, hydroxy or $C_{1-6}$ alkyl.

2. An organophotoconductor according to claim 1, wherein

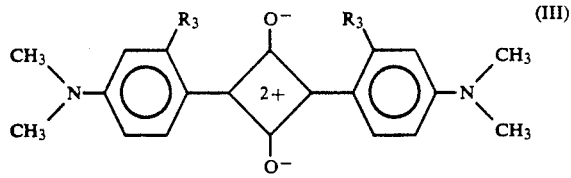

the bisazo compound and the squarylium compound are present in a ratio of about 100:25 to 25:100 by weight.

3. An organophotoconductor according to claim 1, wherein $R_1$ is hydrogen, $R_2$ is methyl or ethyl, X is hydrogen and Y is hydrogen or chloride.

4. An organophotoconductor according to claim 1, wherein $R_1$ is hydrogen, $R_2$ is methyl or ethyl, X is hydrogen, Y is hydrogen or chlorine and $R_3$ is hydroxy.

5. An organophotoconductor according to claim 1, wherein the charge generation layer is interposed between the conductive substrate and the charge transport layer.

6. An organophotoconductor according to claim 1, wherein the bisazo compound and the squarylium compound are dry milled for 2 to 6 hours and are then wet milled in the polymer binder for 4 to 8 hours.

7. An organophotoconductor according to claim 1, wherein the bisazo compound and the polymer binder are in the ratio of 1:3 to 3:1 by weight.

8. An organophotoconductor according to claim 1, wherein a mixture of the bisazo compound and the squarylium compound and the polymer binder are in the ratio of 1:3 to 3:1 by weight.

9. An organophotoconductor according to claim 1, wherein the thickness of the charge generation layer is between 0.1 μm and 5 μm.

10. An organophotoconductor according to claim 1, wherein the charge transport layer comprises a charge transport material and a polymer binder in the ratio of 1:3 to 3:1 by weight.

11. An organophotoconductor according to claim 10, wherein the thickness of the charge transport layer is between 10 μm to 30 μm.

12. An organophotoconductor according to claim 1, wherein the polymer binder in the charge generation layer is selected from the group consisting of polyester, polyvinyl butyral, polycarbonate, polyamides, cellulose acetate-butyrate, phenolic resin and phenoxy resin.

13. An organophotoconductor according to claim 1, wherein a blocking layer is inserted between the conductive substrate and the charge generation layer.

14. An organophotoconductor according to claim 13, wherein a blocking material comprised in the blocking layer is selected from the group consisting of polyamide, polyvinyl alcohol, nitrocellulose, polyurethane and casein.

15. An organophotoconductor as set forth in claim 13, wherein the thickness of the blocking layer is between 0.1 μm to 3.0 μm.

* * * * *